United States Patent [19]

Newhausen et al.

[11] Patent Number: 5,255,586
[45] Date of Patent: Oct. 26, 1993

[54] RADIAL ARM SAW CIRCLE CUTTING APPARATUS

[76] Inventors: Larry E. Newhausen, 9998 N. Leaf River Rd., Egan, Ill. 61047; Steven W. Kloster, 9266 N. Leaf River Rd., Leaf River, Ill. 61047

[21] Appl. No.: 921,627

[22] Filed: Jul. 30, 1992

[51] Int. Cl.⁵ .............................................. B27B 5/02
[52] U.S. Cl. .................... 83/439; 83/410.9; 83/733; 403/374; 411/21; 411/348
[58] Field of Search ............... 83/410.9, 439, 733; 269/57; 403/321, 322, 374, 376; 411/21, 55, 348

[56] References Cited

U.S. PATENT DOCUMENTS

| | | | |
|---|---|---|---|
| 724,433 | 4/1903 | Catudal | 83/439 X |
| 754,343 | 3/1904 | Piper | 83/410.9 |
| 1,635,144 | 7/1927 | Stevens, Jr. | 411/348 X |
| 1,926,798 | 9/1933 | Baumbach | 411/21 X |
| 2,822,986 | 2/1958 | Schreier | 411/21 X |
| 2,968,205 | 1/1961 | Springate | 411/348 |
| 3,170,362 | 2/1965 | Mewse | 411/348 |
| 3,319,209 | 5/1967 | Reyenga | 411/21 X |
| 4,027,566 | 6/1977 | Harrill | 83/439 X |
| 4,047,458 | 9/1977 | Hall | 83/439 |
| 4,398,440 | 8/1983 | Epstein | 83/410.9 X |

FOREIGN PATENT DOCUMENTS

| | | | |
|---|---|---|---|
| 137018 | 12/1902 | Fed. Rep. of Germany | 83/439 |
| 1389533 | 12/1963 | France | 83/410.9 |

Primary Examiner—Frank T. Yost
Assistant Examiner—Clark F. Dexter
Attorney, Agent, or Firm—Leon Gilden

[57] ABSTRACT

A radial arm saw having a support table below the saw is arranged to receive a support sleeve directed through the support table, with the support sleeve adjustably mounting a positioning rod shaft therethrough orthogonally oriented relative to a top surface of the support table. A workpiece is arranged to rotatably mount upon a first end of the positioning shaft to permit manual rotation of the workpiece in engagement with a saw blade of the radial arm saw. In this manner, a circle may be formed from a workpiece plate.

2 Claims, 4 Drawing Sheets

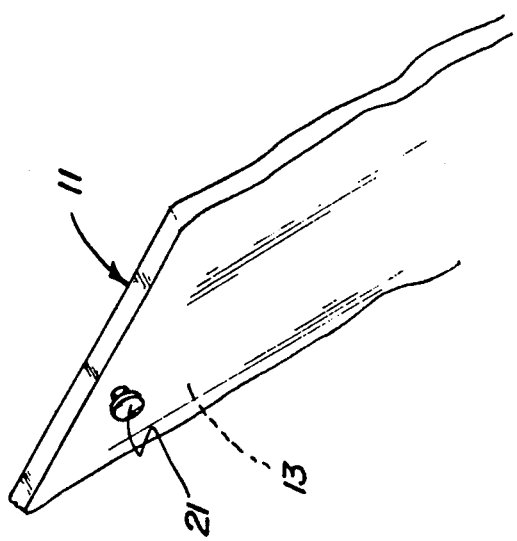
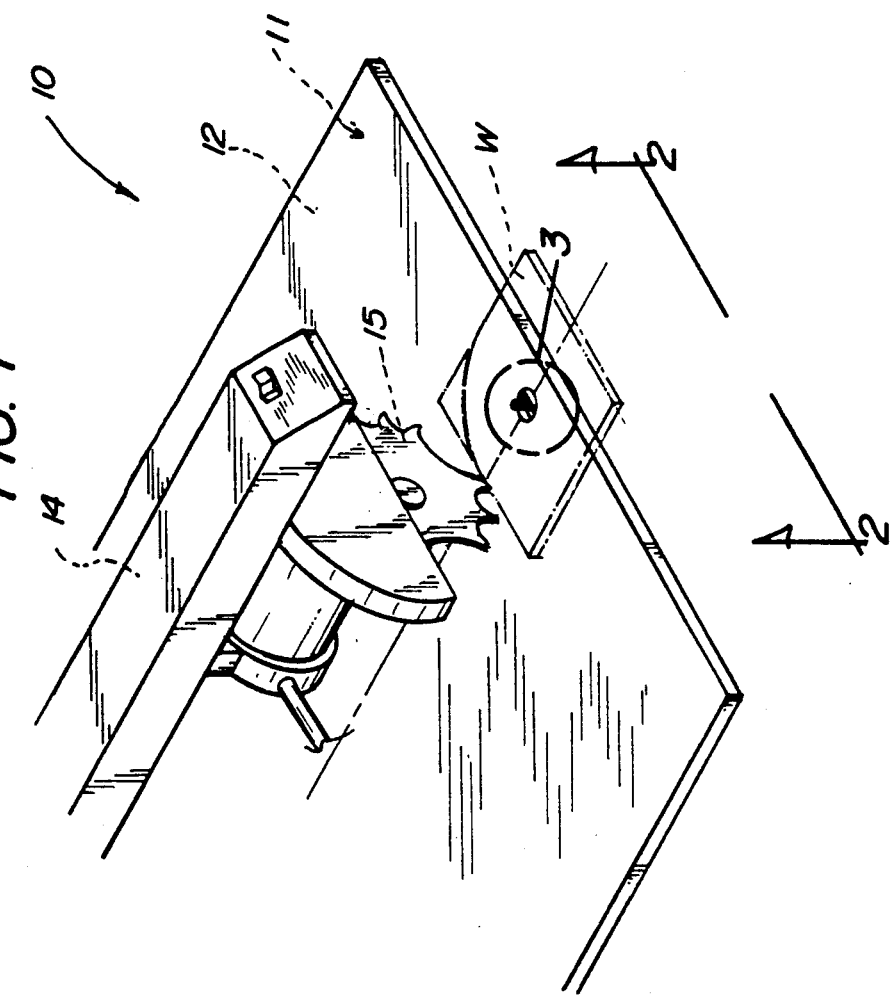

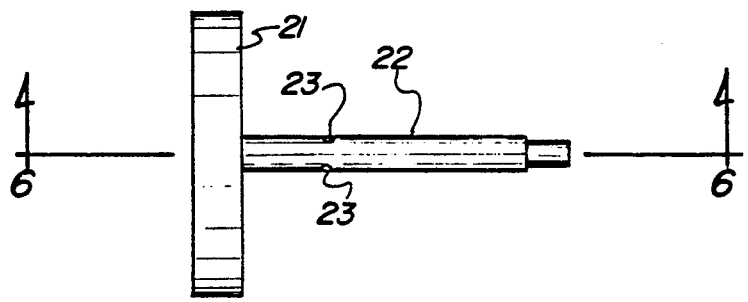
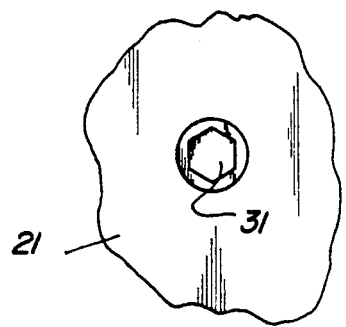
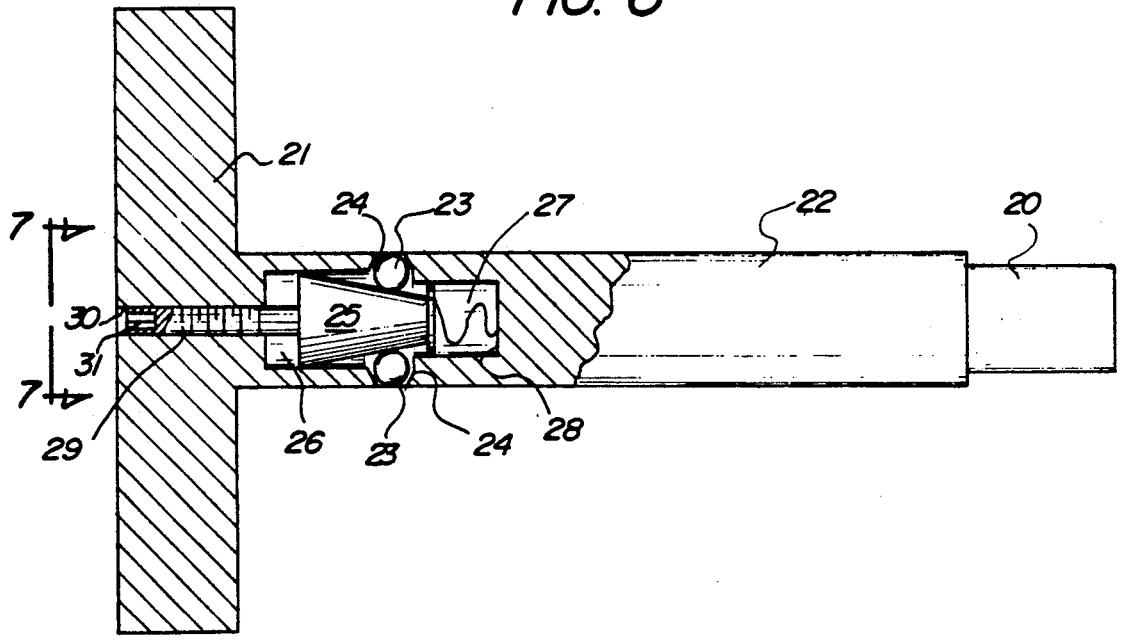

RADIAL ARM SAW CIRCLE CUTTING APPARATUS

BACKGROUND OF THE INVENTION

1. Field of the Invention

The field of invention relates to radial arm saw apparatus, and more particularly pertains to a new and improved radial arm saw circle cutting apparatus arranged to mount a workpiece relative to a radial arm saw to permit the radial arm saw to effect forming of a circle from the workpiece.

2. Description of the Prior Art

Workpiece circle cutting structure has been utilized in the prior art and exemplified by various patents to include U.S. Pat. No. 4,398,440 to Epstein mounting rotatably a workpiece relative to a saw table, wherein the workpiece is arranged to engage an underlying plate to support the workpiece in a rotary manner relative to the saw blade.

U.S. Pat. No. 3,456,346 to Snyder sets forth a circle cutter arranged for manual rotation relative to an underlying workpiece to effect cutting of the workpiece.

U.S. Pat. Nos. 4,081,179 to Frame and 5,014,436 to Kozyrski, et al. are further examples arranged to cut arcs relative to workpieces utilizing an overlying member to effect a circular path about a workpiece.

Accordingly, it may be appreciated that there continues to be a need for a new and improved radial arm saw circle cutting apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of circle cutting apparatus now present in the prior art, the present invention provides a radial arm saw circle cutting apparatus wherein the same is arranged to rotatably mount a workpiece relative to a radial arm saw blade to permit cutting of a circular pattern relative to the workpiece. As such, the general purpose of the present invention, which will be described subsequently in greater detail, is to provide a new and improved radial arm saw circle cutting apparatus which has all the advantages of the prior art circle cutting apparatus and none of the disadvantages.

To attain this, the present invention provides a radial arm saw having a support table below the saw arranged to receive a support sleeve directed through the support table, with the support sleeve adjustably mounting a positioning rod shaft therethrough orthogonally oriented relative to a top surface of the support table. A workpiece is arranged to rotatably mount upon a first end of the positioning shaft to permit manual rotation of the workpiece in engagement with a saw blade of the radial arm saw organization. In this manner, a circle may be formed from a workpiece plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved radial arm saw circle cutting apparatus which has all the advantages of the prior art circle cutting apparatus and none of the disadvantages.

It is another object of the present invention to provide a new and improved radial arm saw circle cutting apparatus which may be easily and efficiently manufactured and marketed.

It is a further object of the present invention to provide a new and improved radial arm saw circle cutting apparatus which is of a durable and reliable construction.

An even further object of the present invention is to provide a new and improved radial arm saw circle cutting apparatus which is susceptible of a low cost of manufacture with regard to both materials and labor, and which accordingly is then susceptible of low prices of sale to the consuming public, thereby making such radial arm saw circle cutting apparatus economically available to the buying public.

Still yet another object of the present invention is to provide a new and improved radial arm saw circle cutting apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention with the workpiece shown in phantom lines-; line 9, change [orthographic] to -isometric-;.

FIG. 2 is an isometric view, taken along the lines 2—2 of FIG. 1 in the direction indicated by the arrows.

FIG. 5 is an orthographic side view of a modified positioning rod shaft structure utilized by the invention.

FIG. 6 is an orthographic view, taken along the lines 6—6 of FIG. 5 in the direction indicated by the arrows.

FIG. 7 is an orthographic view, taken along the lines 7—7 of FIG. 6 in the direction indicated by the arrows.

DESCRIPTION OF THE PREFERRED EMBODIMENT

Figure 3:
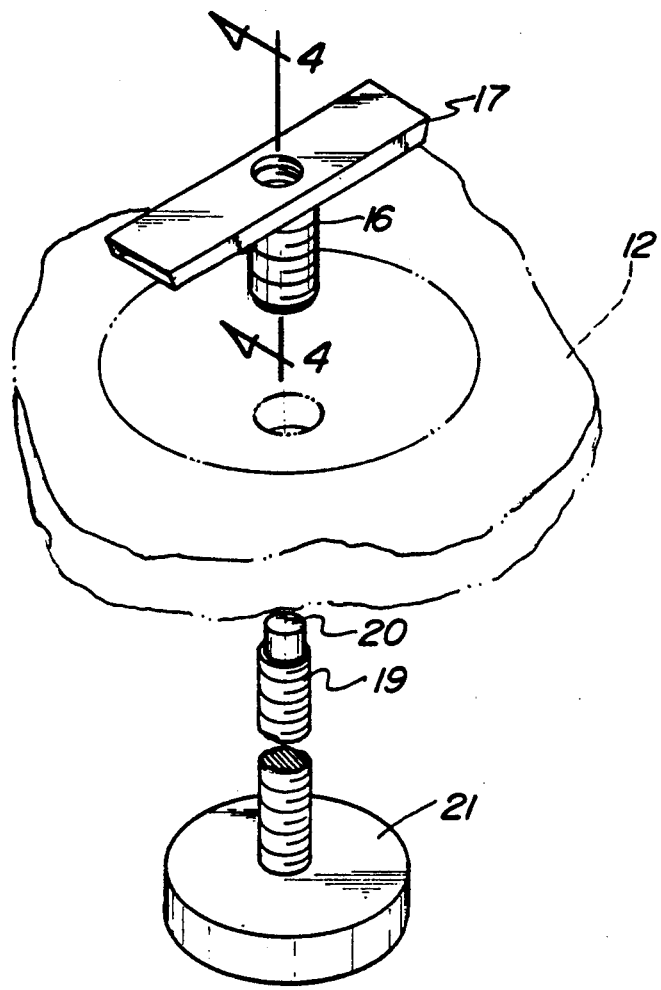
FIG. 3 is an exploded isometric illustration of an embodiment of the workpiece positioning structure to be mounted relative to the associated work table (shown) in phantom lines) of the radial arm saw.
Figure 4:
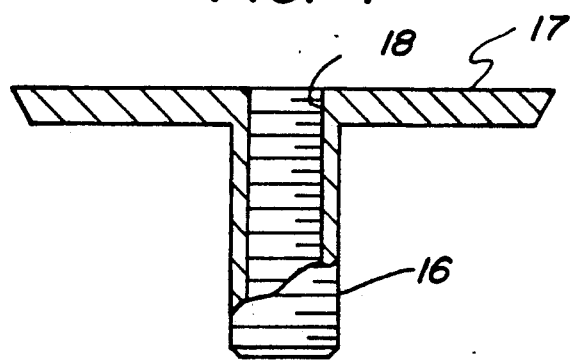
FIG. 4 is an orthographic view of the sleeve, taken along the lines 4—4 of FIG. 3 in the direction indicated by the arrows.

With reference now to the drawings, and in particular to FIGS. 1 to 9 thereof, a new and improved radial arm saw circle cutting apparatus embodying the principles and concepts of the present invention and generally designated by the reference numeral 10 will be described.

More specifically, the radial arm saw circle cutting apparatus 10 of the instant invention essentially comprises a support table 11 having a table top surface 12 spaced from a table bottom surface 13. A saw arm 14 positioned above the table top surface 12 mounts a saw blade 15 rotatably relative to the top surface.

An externally threaded support sleeve 16 is provided (see FIGS. 3 and 4) and directed through the support table in an orthogonal relationship, having an abutment flange 17 at a first end of the support sleeve for engagement with the top surface 12 of the support table 11. An internally threaded sleeve bore 18 is directed through the support sleeve in a coaxially aligned relationship. In the embodiment illustrated in the FIG. 3, an externally threaded positioning rod 19 is provided having a positioning rod first end 20 oriented above the support table top surface 12, as well as the abutment flange 17. A positioning rod handle 21 is mounted at a second end of the positioning rod in a fixed relationship below the bottom surface 13 of the support table 11 to permit projection of the positioning rod through the support sleeve to permit its projection above the top surface. A workpiece "W" (see FIG. 1) is provided, and the workpiece is typically formed with a counterbore, such as counter-bore 37 illustrated in FIG. 9 to receive the positioning rod first end 20 therewithin. In this manner, the workpiece is rotatably mounted relative to the saw blade 15 permitting its manual rotation and guidance along the saw blade 15 when the saw blade 15 is rotated to effect the cutting of a circle, as indicated in FIG. 1.

FIGS. 5-7 indicate a modified positioning rod, to include a cylindrical smooth rod shaft 22 having locking spheres 23 projecting through sphere openings 24 on diametrically opposed sides of the positioning rod shaft 22 spaced above the handle 21, with the spheres 23 of a first diameter, and the openings 24 of a second diameter less than the first diameter. When the modified shaft 22 is directed into the sleeve 16, a threaded adjustment rod 29 is rotated that is threadedly directed within an adjustment rod threaded bore 30 coaxially directed into the positioning rod shaft 22 directed through the handle 21 in a coaxially aligned relationship, having a wrench receiving cavity 31 in the threaded adjustment rod 29 to effect rotation of the adjusting rod 20. The adjusting rod 29 mounts a conical abutment block 25, spaced from a cavity floor of the cavity 26, that is slidably mounted within a cylindrical cavity 26 coaxially oriented within the shaft 22 intersecting the locking sphere openings 24. A spring member 27 is interposed between a first end of the abutment block 25 and a roof 28 of the cavity 26 to bias the truncated conical abutment block 25 in a disengaged orientation relative to the spheres 23. Rapidity and ease of positioning and locking of the shaft is achieved to prevent the shaft from unthreading itself during a circle cutting procedure.

Figure 8:
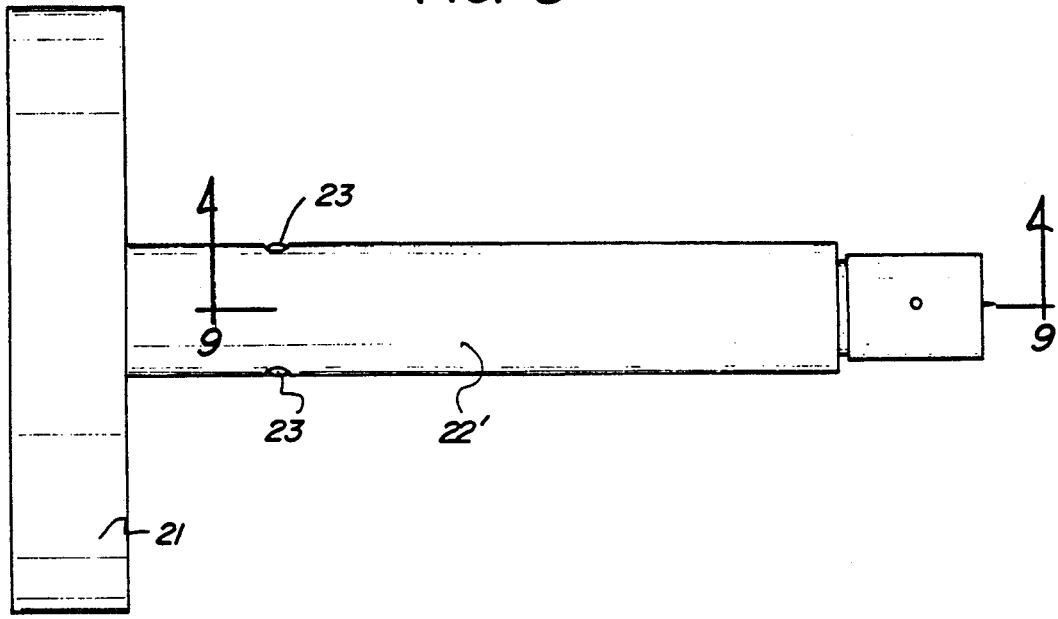
FIG. 8 is an orthographic side view of the further modified positioning rod structure utilized by the invention.
Figure 9:
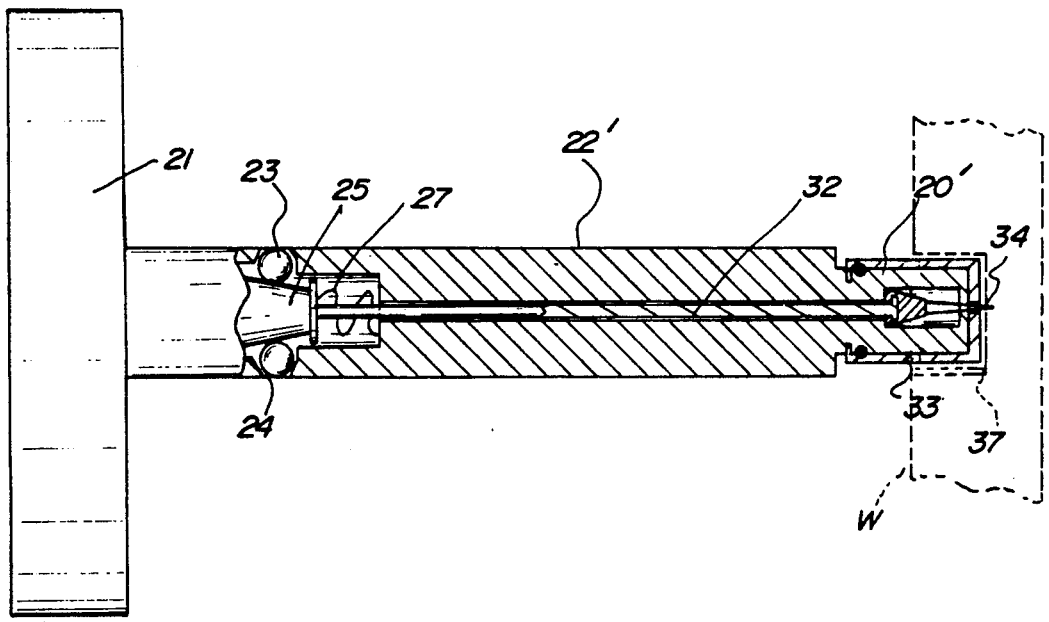
FIG. 9 is an orthographic view, taken along the lines 9—9 of FIG. 8 in the direction indicated by the arrows.

The FIGS. 8 and 9 include the shaft structure as illustrated in the FIGS. 5-7, but further includes a block rod 32 coaxially directed through the shaft 22' coaxially and fixedly mounted to the first end of the abutment block 25. The block rod includes an alignment pin 34 mounted to a first end of the block rod 32 spaced from its second end, that in turn is secured to the first end of the abutment block 25. The alignment pin 34 engages and maintains alignment of the workpiece when projected within the workpiece counter-bore 37, as illustrated, and is received through the positioning rod first end 20' in a coaxially aligned relationship. The positioning rod 20', as illustrated in FIG. 8 and FIG. 9, indicates the use of a rotary sleeve 33 mounted in surrounding relationship relative to the positioning rod first end to provide for enhanced ease of rotation of the workpiece "W" relative to the positioning rod shaft 22' and the first end 20'.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A radial arm saw circle cutting apparatus arranged for mounting to a support table, with the support table including a saw arm rotatably mounting a saw blade, with the table having a top surface and a bottom surface, with the saw arm positioned over the top surface, and the apparatus comprising:

a sleeve including an externally threaded sleeve portion, the externally threaded sleeve portion orthogonally directed through the support table, the sleeve portion including a sleeve portion first end, the sleeve further including an abutment flange fixedly mounted to the sleeve portion first end orthogonally oriented relative to the sleeve portion, with the flange extending exteriorly of the sleeve portion for engagement with the table top surface, a positioning rod inserted into the second end of the sleeve, the positioning rod adjustably and coaxially directed through the sleeve, with the positioning rod having a positioning rod first end and a positioning rod second end, the positioning rod first end extending beyond the abutment flange of the sleeve for receiving a workpiece thereon, the positioning rod second end including a handle, with the handle positioned below the table bottom surface, and wherein, the positioning rod includes a plurality of sphere openings defined by a predetermined first diameter on diametrically opposed sides of the positioning rod, with each of the sphere openings cooperating with a locking sphere positioned within the rod and adjacent each sphere opening, with each of the locking spheres defined by a predetermined second diameter greater than the first diameter such that a portion of each sphere is extendable through its respective sphere opening, and a cylindrical cavity extending within the rod and intersecting the sphere openings, the cylindrical cavity having a cylindrical cavity floor and a cylindrical cavity roof, with the cylindrical cavity slidably receiving a conical abutment block therewithin, with the conical abutment block in engagement with the locking spheres, and the abutment block having an abutment block first end in confrontation with the cavity roof, and the spring member interposed between the abutment block first end and the cavity roof, and the abutment block second end including an externally threaded abutment rod coaxially aligned with the positioning rod directed through the cylindrical cavity floor and extending through the handle to permit rotation of the adjusting rod to effect axial displacement of the abutment block within the cylindrical cavity to cause the abutment block to force the position of each locking sphere through its respective sphere opening and contact an inside wall of the sleeve to lock the positioning rod in the sleeve.

2. An apparatus as set forth in claim 1 wherein the positioning rod first end includes a rotary sleeve rotatably mounted in surrounding relationship relative to the positioning rod first end, and the abutment block including a block rod mounted to the abutment block first end, with the block rod having a block rod first end and a block rod second end, with the block rod second end fixedly secured to the abutment block first end, with the block rod first end directed into the positioning rod first end in a coaxial relationship relative to the positioning rod slidably mounted through the positioning rod, and the block rod first end having an alignment pin extending therefrom coaxially aligned with the block rod, with the alignment pin projecting through the positioning rod first end for reception into the workpiece, whereupon reciprocation of the abutment block within the cylindrical cavity effects projection of the alignment pin within said workpiece.

* * * * *